United States Patent
Higashinaka et al.

(10) Patent No.: US 11,941,365 B2
(45) Date of Patent: Mar. 26, 2024

(54) RESPONSE SELECTING APPARATUS, MODEL LEARNING APPARATUS, RESPONSE SELECTING METHOD, MODEL LEARNING METHOD, AND PROGRAM

(71) Applicant: NIPPON TELEGRAPH AND TELEPHONE CORPORATION, Tokyo (JP)

(72) Inventors: Ryuichiro Higashinaka, Tokyo (JP); Masahiro Mizukami, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 750 days.

(21) Appl. No.: 17/050,347

(22) PCT Filed: Apr. 9, 2019

(86) PCT No.: PCT/JP2019/015437
§ 371 (c)(1),
(2) Date: Oct. 23, 2020

(87) PCT Pub. No.: WO2019/208199
PCT Pub. Date: Oct. 31, 2019

(65) Prior Publication Data
US 2021/0089723 A1   Mar. 25, 2021

(30) Foreign Application Priority Data
Apr. 27, 2018   (JP) .................. 2018-086370

(51) Int. Cl.
*G06F 40/35* (2020.01)
*G06N 5/04* (2023.01)
*G06N 20/00* (2019.01)

(52) U.S. Cl.
CPC ............... *G06F 40/35* (2020.01); *G06N 5/04* (2013.01); *G06N 20/00* (2019.01)

(58) Field of Classification Search
CPC ........... G06F 40/35; G06N 5/04; G06N 20/00
See application file for complete search history.

(56) References Cited

U.S. PATENT DOCUMENTS

| 8,688,667 B1 * | 4/2014 | Kurzion ............... G06F 16/9535 706/20 |
| 10,346,415 B1 * | 7/2019 | Smith ................... G06F 16/285 |

(Continued)

OTHER PUBLICATIONS

Nakano et al. (2015) "Dialogue systems", Corona Publishing Co., Ltd, Tokyo, Japan.

(Continued)

*Primary Examiner* — Anne L Thomas-Homescu (57) ABSTRACT

A model learning apparatus of the present invention has a question/answer-pair expansion unit and a translation-model learning unit. The question/answer-pair expansion unit generates expansion question/answer pairs by increasing the number of question/answer pairs associated with an index indicating that it sounds more like the character. The translation-model learning unit learns a translation model and a reverse translation model by using the expansion question/answer pairs. A response selecting apparatus of the present invention has a record unit, a document search unit, a score calculation unit, and a ranking unit. The record unit records question/answer pairs and the above described learned translation model. The score calculation unit obtains a translation likelihood which is a numerical value based on the probability of obtaining the answer from the input question and calculates a score of each of a search-result question/answer pair with respect to the input question.

15 Claims, 2 Drawing Sheets

(56) References Cited

U.S. PATENT DOCUMENTS

| | | | | |
|---|---|---|---|---|
| 10,360,265 B1* | 7/2019 | Agarwal | ............ | G10L 15/1815 |
| 2011/0289078 A1* | 11/2011 | Woodard | ............ | G06F 16/9562 |
| | | | | 715/833 |
| 2013/0282754 A1* | 10/2013 | Son | ............ | G06F 16/2455 |
| | | | | 707/769 |
| 2016/0335261 A1* | 11/2016 | Salvetti | ............ | G06F 16/2455 |
| 2019/0138660 A1* | 5/2019 | White | ............ | G06F 16/3329 |
| 2021/0342399 A1* | 11/2021 | Sisto | ............ | G06N 3/04 |
| 2023/0205795 A1* | 6/2023 | Dashti Moghaddam | ............ | G06F 16/3325 |
| | | | | 707/759 |

OTHER PUBLICATIONS

Takeuchi et al. (2007) "Construction and optimization of a question and answer database for a real-environment speech-oriented guidance system", in Proc. Oriental COCOSDA, pp. 149-154.

Leuski et al. (2009) "Building effective question answering characters", in Proc. SIGDIAL, pp. 18-27.

Higashinaka et al. (2013) "Using role play for collecting question-answer pairs for dialogue agents", in Proc. INTERSPEECH, pp. 1097-1100.

\* cited by examiner

RESPONSE SELECTING APPARATUS, MODEL LEARNING APPARATUS, RESPONSE SELECTING METHOD, MODEL LEARNING METHOD, AND PROGRAM

CROSS-REFERENCE TO RELATED APPLICATIONS

This application is a U.S. 371 Application of International Patent Application No. PCT/JP2019/015437, filed on 9 Apr. 2019, which application claims priority to and the benefit of JP Application No. 2018-086370, filed on 27 Apr. 2018, the disclosures of which are hereby incorporated herein by reference in their entireties.

TECHNICAL FIELD

The present invention relates to a response selecting apparatus for outputting a response for an input question, a response selecting method, a model learning apparatus for a translation model, which is to be recorded in the response selecting apparatus, a model learning method, and a program for causing a computer to function as an apparatus of these.

BACKGROUND ART

Use of dialogue systems (voice agents and personal robots) has become common. The dialogue systems are roughly categorized into two types. One of them is a task-oriented dialogue system and the other is a non-task-oriented dialogue system. The former one is for carrying out predetermined tasks by dialogues, and the latter one is mainly for so-called ordinary conversations. The types thereof are described in detail in Non-Patent Literature 1.

Recently, as personal assistants on smartphones, personal robots, etc. have become common, the needs to continuously interact with users are increasing. Therefore, dialogue systems are also required to consistently respond for a long period of time, in other words, required to respond with personality. Several methods to realize answers with personality by dialogue systems have been proposed. The most basic one is to prepare dialogue rules associated with a particular character or prepare question/answer pairs and make answers by using them. In the systems of Non-Patent Literatures 2 and 3, question/answer pairs are prepared, and answers with personality are realized by searching for them as case examples.

As a method to efficiently collect such question/answer pairs, a method called "role play-based question answering" as shown in Non-Patent Literature 4 has been proposed. In this method, many online users pretend to be one character and respond to questions. Since many people pretend to be one person to generate data, the question/answer pairs associated with the certain character can be efficiently collected.

CITATION LIST

Non-Patent Literature

Non-Patent Literature 1: Mikio Nakano, Kazunori Komaya, Kotaro Funakoshi, Yukiko Nakano, Manabu Okumura (supervisor), "Dialogue system", Corona Publishing Co., Ltd, 2015.

Non-Patent Literature 2: Shota Takeuchi, Tobias Cincarek, Hiromichi Kawanami, Hiroshi Saruwatari, and Kiyohiro Shikano, "Construction and optimization of a question and answer database for a real-environment speech-oriented guidance system", in Proc. Oriental COCOSDA, pages 149-154, 2007.

Non-Patent Literature 3: Anton Leuski, Ronakkumar Patel, David Traum, and Brandon Kennedy, "Building effective question answering characters", in Proc. SIGDIAL, pages 18-27, 2009.

Non-Patent Literature 4: Ryuichiro Higashinaka, Kohji Dohsaka, and Hideki Isozaki, "Using role play for collecting question-answer pairs for dialogue agents", in Proc. INTERSPEECH, pages 1097-1100, 2013.

SUMMARY OF THE INVENTION

Technical Problem

The answers of the question/answer pairs obtained by the role play-based question answering can be used to make responses without change. However, the answers are selected without evaluating how much the answers are appropriate. Therefore, there is a problem that, if the online users happen to write inappropriate answers, inappropriate responses are output.

The present invention has been accomplished in view of such a problem, and it is an object of the present invention to obtain a response, which sounds more like a character determined in advance than a conventional one, with respect to an input question.

Means for Solving the Problem

A response selecting apparatus of the present invention outputs one or a plurality of responses to an input question, which is inputted a question. The response selecting apparatus of the present invention has a record unit, a document search unit, a score calculation unit, and a ranking unit. The record unit records question/answer pairs, which are pairs of a question and an answer, and a learned translation model for obtaining an answer from a question. The translation model is learned in accordance with a degree indicated by an index by using a pair of a question and an answer associated with the index indicating the degree of how much the answer sounds like a character. The document search unit uses the input question as input, searches for a question/answer pair by a search method determined in advance from the question/answer pairs recorded in the record unit, and outputs the searched question/answer pair as a search-result question/answer pair. The score calculation unit uses the input question and the answer of the search-result question/answer pair as input, obtains a translation likelihood, which is a numerical value based on a probability of obtaining the answer from the input question, by using the translation model, and calculates a score of each of the search-result question/answer pair with respect to the input question based on the translation likelihood. The ranking unit selects a predetermined number of the search-result question/answer pair in an order of appropriateness indicated by the score and outputs the answer of the selected search-result question/answer pair as a response.

The model learning apparatus of the present invention generates at least one of a learned translation model for obtaining an answer from a question and a learned reverse translation model for obtaining a question from an answer. The model learning apparatus of the present invention has a record unit, a question/answer-pair expansion unit, and a translation-model learning unit. The record unit records question/answer pairs, which are pairs of a question and an answer, an expansion question/answer pair, and the translation model for obtaining the answer from the question or the reverse translation model for obtaining the question from the answer. The question/answer pair is associated with an index indicating a degree of how much the answer sounds like a character, which is determined in advance, for each of the question/answer pair. The question/answer-pair expansion unit generates the expansion question/answer pair by increasing the number of the question/answer pair associated with the index indicating that the answer sounds more like the character. The translation-model learning unit learns at least one of the translation model and the reverse translation model by using the expansion question/answer pair.

Effects of the Invention

According to the response selecting apparatus of the present invention, the translation model used by the score calculation unit is learned in accordance with the degree indicated by the index by using the pair of the question and the answer associated with the index, which indicates the degree of how much the answer sounds like the character. Therefore, how much the answer of the question/answer pair sounds like the character can be evaluated. Therefore, the response which sounds more like the character, which is determined in advance, than a conventional one can be obtained.

According to the model learning apparatus of the present invention, the question/answer-pair expansion unit generates the expansion question/answer pairs, in which the number of the question/answer pair associated with the index indicating that it sounds more like the character is increased, and the translation-model learning unit learns the translation model or the reverse translation model by using the expansion question/answer pair. Therefore, learning can be carried out so that the more the answer of the question/answer pair sounds like the character, the higher the translation likelihood or the reverse translation likelihood. Therefore, when the translation model and/or the reverse translation model generated by the model learning apparatus of the present invention is used, the response selecting apparatus can obtain a response which sounds more like the character, which is determined in advance, than a conventional one.

DESCRIPTION OF EMBODIMENTS

Hereinafter, an embodiment of the present invention will be described in detail. Note that the components having the same functions are denoted by the same numbers, and redundant description will be omitted.

Example 1

<Response Selecting Apparatus>

Figure 1:
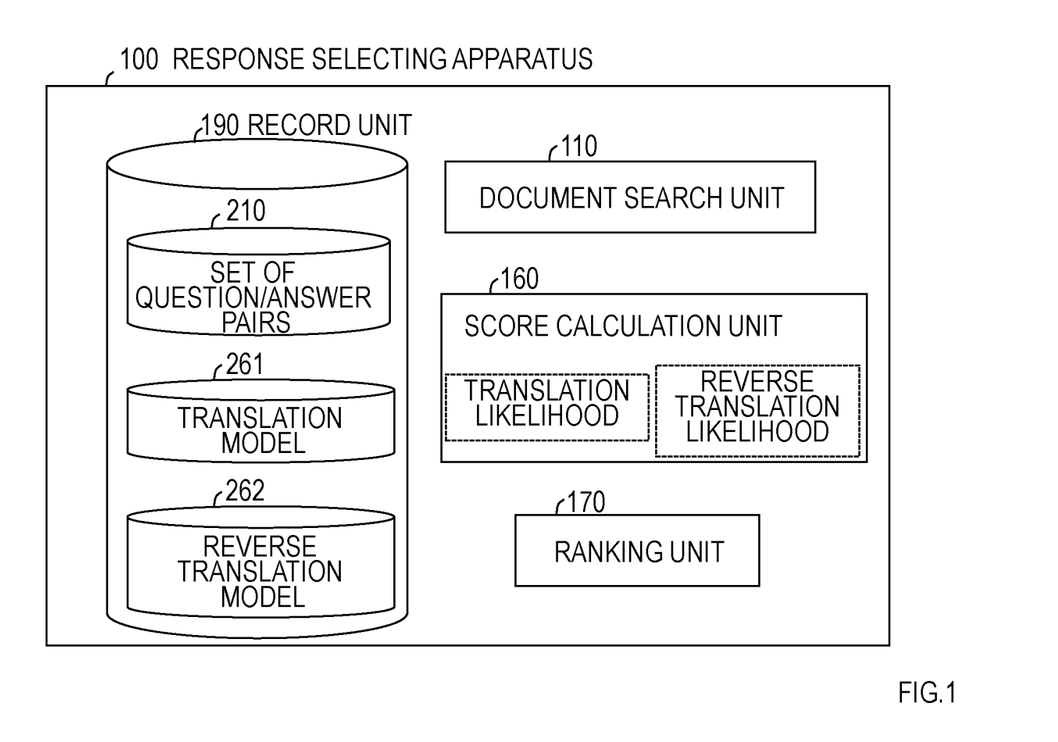
FIG. 1 is a drawing showing a functional configuration example of a response selecting apparatus of the present invention.
Figure 2:
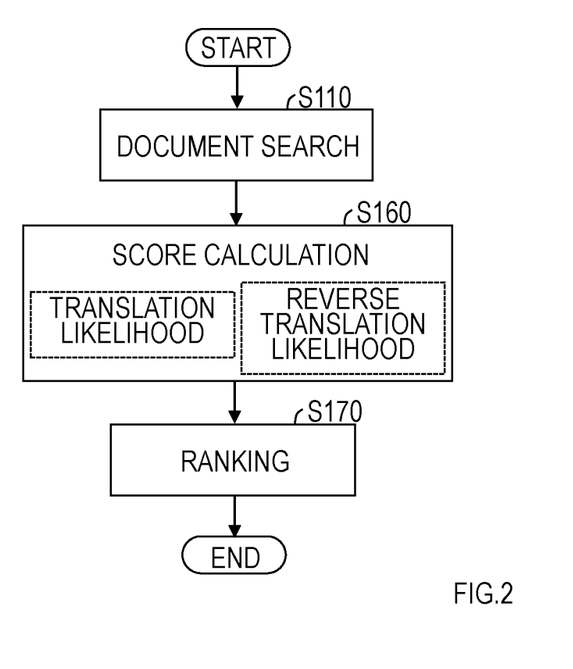
FIG. 2 is a drawing showing a process flow example of the response selecting apparatus of the present invention.

FIG. 1 shows a functional configuration example of a response selecting apparatus of the present invention. FIG. 2 shows a process flow example of the response selecting apparatus of the present invention. A response selecting apparatus 100 of the present invention outputs one or a plurality of responses, which sound(s) like a character determined in advance, with respect to an input question, which is inputted a question. For example, it may be determined in advance to output M responses, wherein M is an integer of 1 or more. For example, M=5 may be determined, or M=1 may be used if only one response is desired like a chatbot. The response selecting apparatus 100 is provided with a record unit 190, a document search unit 110, a score calculation unit 160, and a ranking unit 170.

The record unit 190 records a set 210 of question/answer pairs, which are pairs of questions and answers, and a learned translation model 261 for obtaining answers from questions. The record unit 190 may further record a learned reverse translation model 262 for obtaining questions from answers. The "learned translation model for obtaining answers from questions" means a model indicating the probabilities that answers are generated with respect to questions, and the "learned reverse translation model for obtaining questions from answers" means a model indicating the probabilities that a certain question has been asked when an answer(s) is generated. The translation model 261 and the reverse translation model 262 are learned in accordance with the degrees indicated by indexes by using pairs of questions and answers associated with the indexes, which indicate the degrees of how much the answers sound like the character. The expression "learned in accordance with the degrees indicated by indexes" means that learning is carried out so that the more the answer sounds like the character, the higher the generation probability. For example, the learning may be carried out by using a later-described model learning apparatus 200.

The set 210 of the question/answer pairs can be built by collecting many question/answer pairs by using a mechanism of role play-based question answering. The number of the question/answer pairs can be appropriately determined in accordance with, for example, the types of expected questions. For example, about 10,000 question/answer pairs of the answers which sound like a character can be collected for an actually existing person A. Examples of the question/answer pairs include: a pair of a question: "Hello" and an answer "Hi", a pair of a question: "How old are you" and an answer "I'm 30 years old", and so on, and these are created on the assumption of a character determined in advance.

The document search unit 110 uses an input question as input, searches the question/answer pairs, which are recorded in the record unit 190, for a question/answer pair(s) by a search method determined in advance, and outputs that as a search-result question/answer pair(s) (S110). For example, it may be determined in advance that at most N question/answer pair(s) is the search-result question/answer pair(s). An integer of M or higher is represented by N, and N may be, for example, 10. Note that N is desired to be 2 or higher, but may be 1 or higher. The document search unit 110 can use a generally used document search engine (Reference Literature 1: Hatena Blog, Nov. 12, 2014, "Summary about probabilistic information search Okapi BM25", [searched on April 10th, Heisei 30], the Internet <http://sonickun.hatenablog.com/entry/2014/11/12/122806>). Specifically, content words (nouns, verbs, adjectives, etc.) are extracted from the input question by morphological analysis, and the question/answer pair(s) having the question(s) with which important content words highly match can be searched for and output. Also, the document search unit 110 may also output a numerical value, which indicates the match degree of the important content words, and input the numerical value to the score calculation unit 160.

The record unit 190 may further record indexes, which indicate the degrees of how much the answers sound like the character, respectively in association with the question/answer pairs. In such a case, the document search unit 110 can search the question/answer pairs, which are recorded in the record unit 190, for the question/answer pair(s) also by using these indexes.

Examples of the indexes, which indicate the degrees of how much they sound like the character, include: a first index (a numerical value indicating how good the response is) evaluated by a person(s) other than the character himself/herself, a second index indicating that it is an answer responded by the character himself/herself (a label indicating that the response is made by the character himself/herself), and a third index indicating that it is certified by the character himself/herself for sounding like the character (a label indicating that the response is certified by the character himself/herself). Hereinafter, the character himself/herself will be referred to as a person A.

The first index (the numerical value indicating how good the response is) can be acquired, for example, by showing a question/answer pair to online users and using a mechanism which increments the value by one if a button is pressed when the online user thinks the response sounds like the person A. If that button is pressed 10 times for a certain response, the first index (the numerical value indicating how good the response is) is 10. For example, this numerical value will be referred to as "sounds-like value". In addition, the person A may join the process of collecting questions and answers by the role play-based question answering. If the person A writes a response, the response is labeled with the fact that it is written by the person A, and this makes the second index. This is a label indicating that the response is made by the character himself/herself, and this label will be referred to as a self label. Collected question/answer pairs may be shown to the person A in the end so that the person selects the response(s) she/he thinks good. A label (third index) indicating certification by the character himself/herself is given to such a response. This label will be referred to as a certification label. In this manner, the question/answer pairs may be associated with the first indexes (sounds-like value), the second indexes (self labels), and the third indexes (certification labels), which are three types of additional information. Note that the first index (sounds-like value) which is the numerical value indicating how good the response is, the second index (self label) which is the label indicating that the response is made by the person himself/herself, and the third index (certification label) which is the label indicating that the response is certified by the person himself/herself do not have to exclude one another. For example, if the person himself/herself inputs a numerical value indicating how good the response is, the response may be considered to be certified by the person himself/herself.

When the document search unit 110 uses the first index (sounds-like value), the second index (self label), and the third index (certification label), which are three types of additional information, more appropriate search-result question/answer pairs can be searched for. For example, a search only for those equal to or higher than a threshold value of the first index (sounds-like value), a search only for those with the self label, and a search only for those with the certification label can be carried out. As a result, the question/answer pairs having the answers which sound more like the person A can be obtained. On the other hand, if the search range is limited, the number of question/answer pairs searched for is reduced. Therefore, the range of search can be appropriately limited in consideration of, for example, the number of the question/answer pairs to be searched for.

The score calculation unit 160 uses the input question and the answer of the search-result question/answer pair as input, obtains a translation likelihood which is a numerical value based on the probability that the answer is obtained from the input question by using at least the translation model, and calculates a score of each search-result question/answer pair with respect to the input question based on the translation likelihood (S160). The score calculation unit 160 may further obtain a reverse translation likelihood which is a numerical value based on the probability that the input question is obtained from the answer by using the reverse translation model and calculate a score of each search-result question/answer pair with respect to the input question based on the translation likelihood and the reverse translation likelihood.

The translation model is statistical information for rewriting an input sentence and translating it to another sentence. For example, it retains the information showing that which words are tend to be rewritten to which words. This is generally used in machine translation. Recently, this translation model is often expressed by a neural network, and rewriting of a question into a response by using a translation model learned from a massive amount of sentence pairs (called a seq2seq model or an encoder-decoder model) has been actively studied (Reference Literature 2: Oriol Vinyals and Quoc Le, "A neural conversational model", arXiv preprint arXiv: 1506.05869, 2015). The translation model is capable of calculating the generation probability of an output sentence with respect to an input sentence in addition to rewriting of input sentences. The generation probability represents the appropriateness of the output sentence with respect to the input sentence. Since this probability value becomes an extremely small value, specifically, a value of a logarithmic likelihood can be used. Also, since the logarithmic likelihood reduces depending on the number of words, the logarithmic likelihood can be normalized by dividing it by the number of words. The value obtained by normalizing the logarithmic likelihood will be referred to as a translation likelihood (translation score). The translation model can be built by preparing a massive amount of the pairs of question sentences and response sentences and learning a model. For example, a translation-model building tool used to realize a practical translation service can be used.

Building of the translation model requires a massive amount of sentence pairs. If the number of the question/answer pairs is low (for example, if the number is about 10,000), there is a possibility that an appropriate translation model cannot be built. In such a case, first, an initial translation model is learned by using about 500,000 question/answer pairs, which have been created by putting importance on quantity without particularly taking a character into consideration. Then, based on the initial translation model, adaptation to question/answer pairs, which have been created on the assumption of a character determined in advance, can be made to build a translation model about the character.

If learning is carried out by switching input sentences to output sentences when a translation model is learned, a translation model which generates input sentences from output sentences can be also built. Therefore, a translation model (referred to as "reverse translation model") can be built by using a similar procedure with input sentences and output sentences switched from each other. The probability obtained from this reverse translation model is the value indicating how much the question sentence is appropriate in view of the response sentence. Also in this case, the value can be obtained by dividing the logarithmic likelihood by the number of words. This value will be referred to as a reverse translation likelihood (translation score (opposite direction)).

The score calculation unit 160, for example, sorts the search-result question/answer pairs in the descending order of the translation likelihoods thereof to obtain the rank r of each of them. Then, the score calculation unit 160 may obtain a numerical value translation score based on the translation likelihood by $$1.0-(r-1)/\text{max\_rank} \tag{1},$$

wherein max_rank is the number of the search-result question/answer pairs, to obtain a value between 0 and 1. This max_rank may be the maximum number N, which is searchable by the document search unit 110. For example, in a case with max_rank=10 and r=5, the numerical value translation_score based on the translation likelihood becomes 0.6. Similarly, the score calculation unit 160 can also obtain a numerical value rev_translation_score based on the reverse translation likelihood by sorting them in the descending order of the reverse translation likelihood and applying Formula (1). Then, a score score(Q,(Q',A')) can be obtained, for example, in a following manner, wherein the input question is Q, the question of the search-result question/answer pair is Q', and the answer is A'.

$$\text{score}(Q, Q', A')) = w_1 \cdot \text{translation\_score} + w_2 \cdot \text{rev\_translation\_score} \tag{2}$$

Herein, w1 and w2 are weights for determining which numerical value is considered to be important. Both of them may be 1.0, or the values may be tuned in consideration of the characteristics of the translation model and the reverse translation model. The score score(Q,(Q',A')) becomes the output of the score calculation unit 160.

The ranking unit 170 selects a predetermined number of search-result question/answer pairs in the order of appropriateness indicated by the scores and outputs the answers of the selected search-result question/answer pairs as responses (S170). In the above described example, the larger the value of the score, the more appropriate it is. Therefore, the ranking unit 170 can select M search-result question/answer pairs in the descending order of the score values and output the answers of the selected search-result question/answer pairs as responses. Note that, if M=5, 5 responses are output. If the response is desired to be only one response like a chatbot, M=1 can be set.

According to the response selecting apparatus of the present invention, the translation model used by the score calculation unit is learned in accordance with the degrees indicated by the indexes by using the pairs of questions and answers associated with the indexes, which indicate the degrees of how much the answers sound like the character. Therefore, how much the answers of the question/answer pairs sound like the character can be evaluated. Therefore, the response which sounds more like the character, which is determined in advance, than conventional one can be obtained. Furthermore, if the score calculation unit also uses the reverse translation model, the response which sounds further like the character can be obtained.

<Model Learning Apparatus>

Figure 3:
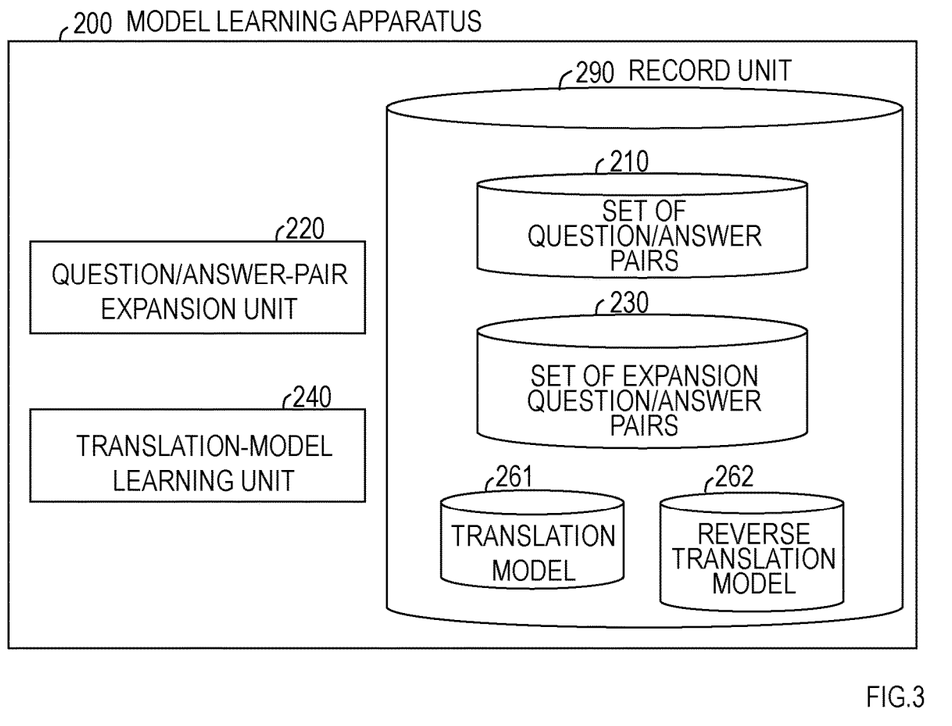
FIG. 3 is a drawing showing a functional configuration example of a model learning apparatus of the present invention.
Figure 4:
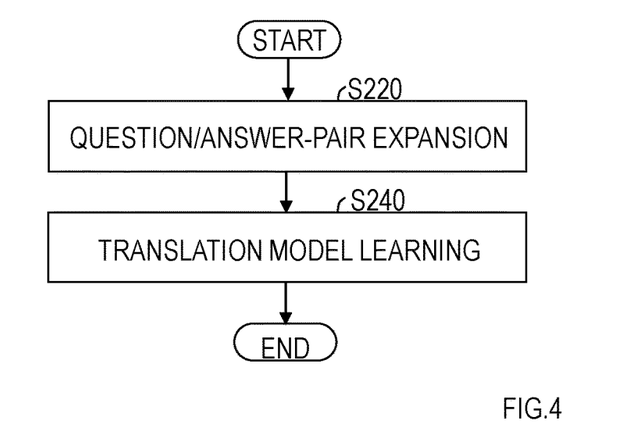
FIG. 4 is a drawing showing a process flow example of the model learning apparatus of the present invention.

FIG. 3 shows a functional configuration example of a model learning apparatus of the present invention. FIG. 4 shows a process flow example of the model learning apparatus of the present invention. The model learning apparatus 200 of the present invention generates at least one of the learned translation model for obtaining answers from questions and the learned reverse translation model for obtaining questions from answers. The model learning apparatus 200 is provided with a record unit 290, a question/answer-pair expansion unit 220, and a translation-model learning unit 240.

The record unit 290 records a set 210 of question/answer pairs, which are pairs of questions and answers, a set 230 of expansion question/answer pairs, and a translation model 261 for obtaining answers from questions or a reverse translation model 262 for obtaining questions from answers. In the set 210 of the question/answer pairs, the indexes indicating the degrees of how much the answers sound like the character with respect to the character determined in advance are associated with the question/answer pairs, respectively.

The question/answer-pair expansion unit 220 generates expansion question/answer pairs by increasing the number of the question/answer pairs, which are associated with the indexes indicating that they sound more like the character (S220). For example, the question/answer-pair expansion unit 220 expands the question/answer pairs by using, as input, question/answer pairs and the first index (sounds-like value), the second index (self label), and the third index (certification label), which are three types of additional information. Specifically, the question/answer pairs can be expanded by processing of: (a) increasing the number of question/answer pairs to which the first index (sounds-like value) is given by x times, (b) increasing the number of question/answer pairs to which the second index (self label) is given by y times, and (c) increasing the number of question/answer pairs to which the third index (certification label) is given by z times. If the three types of additional information are redundant, the expansion can be carried out by using a priority rule. Specifically, the expansion can be attempted in the order of (b)>(c)>(a), wherein expansion is not carried out again by another processing if this expansion is executed. This is a way of expansion which puts importance on the second index (self label), but another priority rule may be used. For example, importance may be put on (a). Also, x may be determined depending on the number of the first index (sounds-like value). Specifically, it may be determined as: x="the number of first indexes (sounds-like value)"×c, wherein c is a constant and may be appropriately determined by a designer. For example, the constant c is 1.0. This means that the question/answer pairs are expanded simply by the number of the first indexes (sounds-like values). The designer can also appropriately determine y and z. For example, y may be determined to be 10, and z may be determined to be 5. The question/answer-pair expansion unit 220 records the question/answer pairs, which have been expanded by the above described processing, as elements of the set 230 of the expansion question/answer pairs in the record unit 290.

If <Q: "How are you", A: "I'm fine!"> is one question/answer pair, the above described increase of the number means simply adding the same question/answer pair. For example, doubling the number of this question/answer pair means adding another <Q: "How are you", A: "I'm fine!">.

When the number is increased in this manner, the statistical amount of the words, etc. included in this question/answer pair is increased by the learning processing, and they are facilitated to be ranked high.

The translation-model learning unit 240 learns at least one of the translation model 261 and the reverse translation model 262 by using the expansion question/answer pairs (S240). As a matter of course, both of the translation model 261 and the reverse translation model 262 may be learned. Specifically, as shown by the description of the response selecting apparatus 100, the translation model can be built by preparing a massive amount of pairs of question sentences and response sentences and learning the model. For example, a translation-model building tool used to realize a practical translation service can be used. If the number of the question/answer pairs is small (for example, if the number is about 10,000), there is a possibility that an appropriate translation model cannot be built. In such a case, first, an initial translation model is learned by using about 500,000 question/answer pairs, which have been created by putting importance on quantity without particularly assuming a character. Then, the translation model about a character can be built by adapting question/answer pairs created on the assumption of the character, which is determined in advance, based on the initial translation model. Furthermore, a reverse translation model can be built by switching input sentences and output sentences by using a similar procedure.

According to the model learning apparatus of the present invention, the question/answer-pair expansion unit generates the expansion question/answer pairs, which are obtained by increasing the number of the question/answer pairs associated with the indexes indicating that they sound more like the character, and the translation-model learning unit carries out learning of the translation model or the reverse translation model by using the expansion question/answer pairs. Therefore, the learning can be carried out so that the more the answer belonging to the question/answer pair sounds like the character, the higher the translation likelihood or the reverse translation likelihood thereof. Therefore, by using the translation model and/or the reverse translation model generated by the model learning apparatus of the present invention, the responses which sound more like the character, which is determined in advance, than conventional ones can be obtained by the response selecting apparatus.

[Program, Recording Medium]

The above described various processing is not limited to be executed in the chronological order along the description, but may be executed in parallel or individually depending on the processing capability of the apparatus which executes the processing or depending on needs. Other than that, it goes without saying that modifications can be appropriately made within the range not departing from the gist of the present invention.

When the above described configuration is to be realized by a computer, the processing contents of the functions to be owned by apparatuses are described by a program. Then, when this program is executed by the computer, the above described processing functions are realized on the computer.

The program describing these processing contents can be recorded in a computer-readable recording medium. The computer-readable recording medium may be, for example, any of a magnetic recording apparatus, an optical disk, a magnetic optical recording medium, a semiconductor memory, or the like.

This program is distributed, for example, by selling, giving, lending, or the like of a portable recording medium such as a DVD, a CD-ROM, or the like recording the program. Furthermore, the program may be configured to be distributed by storing the program in a storage apparatus of a server computer and transferring the program from the server computer to another computer via a network.

The computer, which executes such a program, for example, first, once store the program, which is recorded in a portable recording medium or has been transferred from a server computer, in a storage apparatus of its own. Then, when the processing is to be executed, this computer reads the program, which is stored in the recording medium of its own, and executes processing in accordance with the read program. As another execution mode of this program, the computer may directly read the program from the portable recording medium and execute processing in accordance with the program. Furthermore, every time the program is transferred from the server computer to this computer, the computer may successively execute processing in accordance with the received program. Alternatively, the above described processing may be configured to be executed by a so-called ASP (Application Service Provider) type service, which realizes the processing function without transferring the program from the server computer to this computer, but only by execution instructions and result acquisition thereof. Note that the program of the present mode includes information which is to be subjected to processing by an electronic computer and is equivalent to a program (data or the like which is not direct instructions to a computer, but has a property that defines processing of a computer).

In this mode, the present apparatus is formed by executing the predetermined program on a computer. However, at least part of these processing contents may be realized by hardware.

REFERENCE SIGNS LIST

100 Response selecting apparatus
110 Document search unit
160 Score calculation unit
170 Ranking unit
190, 290 Record units
200 Model learning apparatus
210 Set of question/answer pairs
220 Question/answer-pair expansion unit
230 Set of expansion question/answer pairs
240 Translation-model learning unit
261 Translation model
262 Reverse translation model

The invention claimed is:

1. A response selecting apparatus for outputting one or a plurality of responses to an input question, which is inputted a question, the response selecting apparatus comprising:
a recording medium recording question/answer pairs, which are pairs of a question and an answer, and a learned translation model for obtaining an answer from a question; and
processing circuitry configured to:
execute a document search processing which uses the input question as input, searches for a question/answer pair by a search method determined in advance from the question/answer pairs recorded in the recording medium, and outputs the searched question/answer pair as a search-result question/answer pair;
execute a score calculation processing which uses the input question and the answer of the search-result question/answer pair as input, obtains a translation likelihood, which is a numerical value based on a probability of obtaining the answer from the input question, by using the translation model, and calculates a score of each of the search-result question/answer pair with respect to the input question based on the translation likelihood; and execute a ranking processing which selects a predetermined number of the search-result question/answer pair in an order of appropriateness indicated by the score and outputs the answer of the selected search-result question/answer pair as a response;

wherein the translation model is learned in accordance with a degree indicated by an index by using a pair of a question and an answer associated with the index indicating the degree of how much the answer sounds like a character, and the index indicating the degree of how much the answer sounds like the character includes: a first index evaluated by a person other than the character himself/herself, a second index indicating that the answer is responded by the character himself/herself, and a third index indicating that the character himself/herself certified that the respond sounds like the character.

2. A response selecting apparatus for outputting one or a plurality of responses to an input question, which is inputted a question, the response selecting apparatus comprising:

wherein a recording medium recording question/answer pairs, which are pairs of a question and an answer, a learned translation model for obtaining an answer from a question, and a learned reverse translation model for obtaining a question from an answer;

processing circuitry configured to:

execute a document search processing which uses the input question as input, searches for a question/answer pair by a search method determined in advance from the question/answer pairs recorded in the recording medium, and outputs the searched question/answer pair as a search-result question/answer pair;

execute a score calculation processing which uses the input question and the answer of the search-result question/answer pair as input, obtains a translation likelihood, which is a numerical value based on a probability of obtaining the answer from the input question, by using the translation model, obtains a reverse translation likelihood, which is a numerical value based on a probability of obtaining the input question from the answer by using the reverse translation model, and calculates a score of each of the search-result question/answer pair with respect to the input question based on the translation likelihood and the reverse translation likelihood; and execute a ranking processing which selects a predetermined number of the search-result question/answer pair in an order of appropriateness indicated by the score and outputs the answer of the selected search-result question/answer pair as a response; wherein the translation model is learned in accordance with a degree indicated by an index by using a pair of a question and an answer associated with the index indicating the degree of how much the answer sounds like a character, and the reverse translation model is also learned in accordance with a degree indicated by an index by using a pair of a question and an answer associated with the index indicating the degree of how much the answer sounds like the character.

3. The response selecting apparatus according to claim 1, wherein the recording medium records each of the question/answer pair associated with the index indicating the degree of how much the answer sounds like the character, and the document search processing searches for the question/answer pair by also using the index from the question/answer pairs recorded in the recording medium.

4. A model learning apparatus for generating at least one of a learned translation model for obtaining an answer from a question and a learned reverse translation model for obtaining a question from an answer, the model learning apparatus comprising:

a recording medium recording a question/answer pair, which is a pair of a question and an answer, an expansion question/answer pair, and the translation model for obtaining the answer from the question and the reverse translation model for obtaining the question from the answer; and processing circuitry configured to:

execute a question/answer-pair expansion processing which generates the expansion question/answer pair from the question/answer pair; and execute a translation-model learning processing which learns at least one of the translation model and the reverse translation model by using the expansion question/answer pair; wherein the question/answer pair is associated with an index indicating a degree of how much the answer sounds like a character, which is determined in advance, for each of the question/answer pair; and execute the question/answer-pair expansion processing which generates the expansion question/answer pair by increasing the number of the question/answer pair associated with the index indicating that the answer sounds more like the character.

5. A response selecting method for outputting one or a plurality of responses to an input question, which is inputted a question, by using a response selecting apparatus having a recording medium, and a processing circuitry, the response selecting method including:

recording question/answer pairs, which are pairs of a question and an answer, and a learned translation model for obtaining an answer from a question being recorded in the recording medium in advance;

a document search step of, using the input question as input, searching for a question/answer pair by a search method determined in advance from the question/answer pairs recorded in the recording medium, and outputting the searched question/answer pair as a search-result question/answer pair;

a score calculation step of, using the input question and the answer of the search-result question/answer pair as input, obtaining a translation likelihood, which is a numerical value based on a probability of obtaining the answer from the input question, by using the translation model, and calculating a score of each of the search-result question/answer pair with respect to the input question based on the translation likelihood; and a ranking step of, selecting a predetermined number of the search-result question/answer pair in an order of appropriateness indicated by the score and outputting the answer of the selected search-result question/answer pair as a response; wherein the translation model is learned in accordance with a degree indicated by an index by using a pair of a question and an answer associated with the index indicating the degree of how much the answer sound like a character, and the index indicating the degree of how much the answer sounds like the character includes: a first index evaluated by a person other than the character himself/herself, a second index indicating that the answer is responded by the character himself/herself, and a third index indicating that the character himself/herself certified that the respond sounds like the character.

6. A model learning method for generating at least one of a learned translation model for obtaining an answer from a question and a learned reverse translation model for obtaining a question from an answer by using a model learning apparatus having a recording medium, and a processing circuitry, the model learning method including:

recording in advance, in the recording medium, a question/answer pair, which is a pair of a question and an answer, and the translation model for obtaining the answer from the question or the reverse translation model for obtaining the question from the answer;

a question/answer-pair expansion step of generating the expansion question/answer pair from the question/answer pair; and a translation-model learning step of learning the translation model and the reverse translation model by using the expansion question/answer pair; wherein the question/answer pair is associated with an index indicating a degree of how much the answer sounds like a character, which is determined in advance, for each of the question/answer pair; and the question/answer-pair expansion step includes generating the expansion question/answer pair by increasing the number of the question/answer pair associated with the index indicating that the answer sounds more like the character.

7. A non-transitory computer-readable recording medium on which the program for causing a computer to function as the response selecting apparatus according to claim 1 is recorded.

8. The response selecting apparatus according to claim 2, wherein the recording medium records each of the question/answer pair associated with the index indicating the degree of how much the answer sounds like the character, and the document search processing searches for the question/answer pair by also using the index from the question/answer pairs recorded in the recording medium.

9. The response selecting apparatus according to claim 2, wherein the index indicating the degree of how much the answer sounds like the character includes: a first index evaluated by a person other than the character himself/herself, a second index indicating that the answer is responded by the character himself/herself, and a third index indicating that the character himself/herself certified that the respond sounds like the character.

10. A model learning apparatus a recording medium recording a question/answer pair, which is a pair of a question and an answer, an expansion question/answer pair, and the translation model for obtaining the answer from the question or the reverse translation model for obtaining the question from the answer; and processing circuitry configured to:

execute a question/answer-pair expansion processing which generates the expansion question/answer pair from the question/answer pair; and execute a translation-model learning processing which learns at least one of the translation model and the reverse translation model by using the expansion question/answer pair; wherein the question/answer pair is associated with an index indicating a degree of how much the answer sounds like a character, which is determined in advance, for each of the question/answer pair; and execute the question/answer-pair expansion processing which generates the expansion question/answer pair by increasing the number of the question/answer pair associated with the index indicating that the answer sounds more like the character, wherein, the index indicating the degree of how much the answer sounds like the character includes: a first index evaluated by a person other than the character himself/herself, a second index indicating that the answer is responded by the character himself/herself, and a third index indicating that the character himself/herself certified that the respond sounds like the character.

11. A non-transitory computer-readable recording medium on which the program for causing a computer to function as the model learning apparatus according to claim 4 is recorded.

12. A response selecting method for outputting one or a plurality of responses to an input question, which is inputted a question, by using a response selecting apparatus having a recording medium, and a processing circuitry, the response selecting method including:

recording question/answer pairs, which are pairs of a question and an answer, a learned translation model for obtaining an answer from a question, and a learned reverse translation model for obtaining a question from an answer being recorded in the recording medium in advance;

a document search step of using the input question as input, searching for a question/answer pair by a search method determined in advance from the question/answer pairs recorded in the recording medium, and outputting the searched question/answer pair as a search-result question/answer pair;

a score calculation step of using the input question and the answer of the search-result question/answer pair as input, obtaining a translation likelihood, which is a numerical value based on a probability of obtaining the answer from the input question, by using the translation model, obtains a reverse translation likelihood, which is a numerical value based on a probability of obtaining the input question from the answer by using the reverse translation model, and calculates a score of each of the search-result question/answer pair with respect to the input question based on the translation likelihood and the reverse translation likelihood; and a ranking step of selecting a predetermined number of the search-result question/answer pair in an order of appropriateness indicated by the score and outputting the answer of the selected search-result question/answer pair as a response; wherein the translation model is learned in accordance with a degree indicated by an index by using a pair of a question and an answer associated with the index indicating the degree of how much the answer sound like a character, and the reverse translation model is also learned in accordance with a degree indicated by an index by using a pair of a question and an answer associated with the index indicating the degree of how much the answer sounds like the character.

13. A model learning method for generating at least one of a learned translation model for obtaining an answer from a question and a learned reverse translation model for obtaining a question from an answer by using a model learning apparatus having a recording medium, and a processing circuitry, the model learning method including:
 recording in advance, in the recording medium, a question/answer pair, which is a pair of a question and an answer, and the translation model for obtaining the answer from the question or the reverse translation model for obtaining the question from the answer;
 a question/answer-pair expansion step of generating the expansion question/answer pair from the question/answer pair; and
 a translation-model learning step of learning at least one of the translation model and the reverse translation model by using the expansion question/answer pair; wherein
 the question/answer pair is associated with an index indicating a degree of how much the answer sounds like a character, which is determined in advance, for each of the question/answer pair; and
 the question/answer-pair expansion step includes generating the expansion question/answer pair by increasing the number of the question/answer pair associated with the index indicating that the answer sounds more like the character, wherein,
 the index indicating the degree of how much the answer sounds like the character includes: a first index evaluated by a person other than the character himself/herself, a second index indicating that the answer is responded by the character himself/herself, and a third index indicating that the character himself/herself certified that the respond sounds like the character.

14. A non-transitory computer-readable recording medium on which the program for causing a computer to function as the response selecting apparatus according to claim 2 is recorded.

15. A non-transitory computer-readable recording medium on which the program for causing a computer to function as the model learning apparatus according to claim 10 is recorded.

* * * * *